United States Patent [19]

Mori

[11] Patent Number: 4,560,252
[45] Date of Patent: Dec. 24, 1985

[54] OPTICAL FILTER DEVICE

[76] Inventor: Kei Mori, 3-16-3-501, Kaminoge, Setagaya-ku, Tokyo, Japan

[21] Appl. No.: 577,910

[22] Filed: Feb. 7, 1984

[30] Foreign Application Priority Data

Feb. 10, 1983 [JP]   Japan .................................. 58-21042
Feb. 14, 1983 [JP]   Japan .................................. 58-22572

[51] Int. Cl.⁴ ........................ G02B 5/20; G02B 27/10
[52] U.S. Cl. .......................................... 350/315; 350/1.6
[58] Field of Search ............ 350/311, 315, 318, 319, 350/273, 274, 275, 1.6

[56] References Cited

U.S. PATENT DOCUMENTS

| | | | |
|---|---|---|---|
| 3,194,962 | 7/1965 | Carlon et al. | 350/315 |
| 3,247,392 | 4/1966 | Thelen | 350/1.6 |
| 4,229,066 | 10/1980 | Rancourt et al. | 350/1.6 |
| 4,256,363 | 3/1981 | Brisnes | 350/273 |
| 4,339,170 | 7/1982 | Winzer | 350/311 |
| 4,504,109 | 3/1985 | Taga et al. | 350/1.6 |

*Primary Examiner*—John K. Corbin
*Assistant Examiner*—Loha Ben
*Attorney, Agent, or Firm*—Jordan and Hamburg

[57] ABSTRACT

An optical filter device includes a filter member which is located to intersect an optical path along which optical energy having a high density propagates. The filter member is constantly rotated to sequentially shift a part thereof on which the optical energy is incident. The axis of rotation of the filter member is movable perpendicularly thereto within a predetermined range. The filter member transmits a light component having a particular wavelength and reflects at least one of the light components in the other wavelength range.

5 Claims, 4 Drawing Figures

OPTICAL FILTER DEVICE

BACKGROUND OF THE INVENTION

The present invention relates to an optical filter device which is disposed in an optical path to separate a desired wavelength component or components from optical energy propagating therethrough and, more particularly, to an optical filter device which is desirably applicable to optical energy having high energy densities.

As well known in the art, optical energy such as the solar energy or the energy of artificial light may be converged by lenses or the like into light conducting cables, or fiber optic cables, to propagate therethrough to desired locations. The converged optical energy is usable for lighting and other various applications. Such a technique has been implemented by, for example, an artificial light source apparatus in which an artificial light source is disposed in a housing and optical energy emanating from the light source is converged by a lens to reach a light receiving end of a light conducting cable, which is located in another housing, as disclosed in Japanese Patent Application No. 56-11153 by way of example.

While the conducted optical energy may be used with all the wavelength components contained therein, a specific component or components of the optical energy may be separated from the others to be used for particular applications. For example, the applicant has proposed the use of optical energy conducted by a light conductor as described as a light source for photosynthesis, typically cultivation of chlorella or forcing culture of plants. For photosynthetic reactions, ultraviolet rays, infrared rays and like components contained in optical energy are harmful. A solution to such a problem may be the use of an optical filter which intercepts the ultraviolet, infrared and other undesirable light components contained in the conducted optical energy while transmitting visible light component only. However, concerning filters for such applications, problems have existed in that they undergo thermal destruction or deterioration due to the considerable energy density of the conducted light, in that the ultraviolet, infrared and other components undesirable for a particular application are simply wasted to limit the efficiency of optical energy utilization.

SUMMARY OF THE INVENTION

It is therefore an object of the present invention to provide an optical filter device which is capable of effectively and selectively picking up a desired component or components out of converged optical energy.

It is another object of the present invention to provide an optical filter device which is operable even in an optical path along which optical energy having a high density propagates, without being destructed or deteriorated by the heat.

It is another object of the present invention to provide an optical filter device which allows converged optical energy to be utilized with an improved efficiency.

It is another object of the present invention to provide a generally improved optical filter device.

An optical filter device for filtering optical energy having a high energy density which propagates along a predetermined optical path of the present invention comprises a rotatable optical filter located to constantly intersect the optical path at a part thereof, and a drive unit for rotating the optical filter, whereby the optical energy becomes incident on the part of the optical filter which changes every moment due to rotation of the optical filter.

In accordance with the present invention, an optical filter device includes a filter member which is located to intersect an optical path along which optical energy having a high density propagates. The filter member is constantly rotated to sequentially shift a part thereof on which the optical energy is incident. The axis of rotation of the filter member is movable perpendicularly thereto within a predetermined range. The filter member transmits a light component having a particular wavelength and reflects at least one of the light components in the other wavelength range.

The above and other objects, features and advantages of the present invention will become more apparent from the following detailed description taken with the accompanying drawing.

DESCRIPTION OF THE PREFERRED EMBODIMENTS

While the optical filter device of the present invention is susceptible of numerous physical embodimemts, depending upon the environment and requirements of use, substantial numbers of the herein shown and described embodiments have been made, tested and used, and all have performed in an eminently satisfactory manner.

Figure 1:
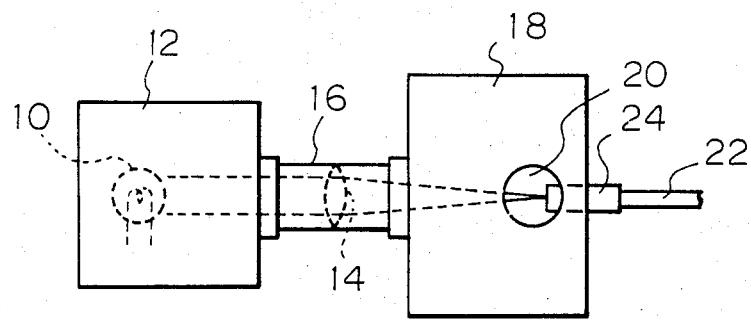
FIG. 1 is a schematic elevation of an artificial light source apparatus to which the present invention is applicable.

Referring to FIG. 1 of the drawing, an artificial light source apparatus to which the present invention is applicable is shown. The apparatus includes an artificial light source 10 which is disposed in a housing 12. A lens 14 is fixed in place inside a hollow cylindrical member 16 which extends from one end of the light source housing 12 to a second housing 18. The arrangement is such that the focal point of the lens 14 is located in a predetermined position in the housing 18. The housing 18 is formed with a window 20 through a side wall thereof so that one may see the neighborhood of the focal point of the lens 14. A light conducting cable 22 is fixed to the housing 18 through a connector 24 such that a light receiving end thereof is positioned at the focal point of the lens 14 within the housing 18.

In the apparatus shown in FIG. 1, the light source 10, lens 14 and a member for fixing the light receiving end of the fiber optic cable 22 are constructed integrally with each other so as to define the focal point of the lens 14. Meanwhile, an arrangement is made such that the light receiving end of the cable 22 is adjustable in position relative to the focal point of the lens 14 within a plane which is perpendicular to the optical axis of the lens 14. These allow the light receiving end of the cable 22 to be accurately positioned at the focal point of the lens 14.

As previously described, the converged optical energy introduced into the cable 22 is usable as a light source for photosynthesis such as forcing culture of plants or chlorella cultivation. For such applications, the light source 10 may comprise a xenon lamp or the like whose luminous intensity is relatively high. In such a case, ultraviolet rays, infrared rays and like components contained in the optical energy emanating from the light source 10 have to be cut off because they are harmful for photosynthetic reactions. Such may be implemented by placing an optical filter in the optical path between the light source 10 and the light conductor 22. However, problems have been left unsolved as already discussed concerning the use of an optical filter.

Figure 2:
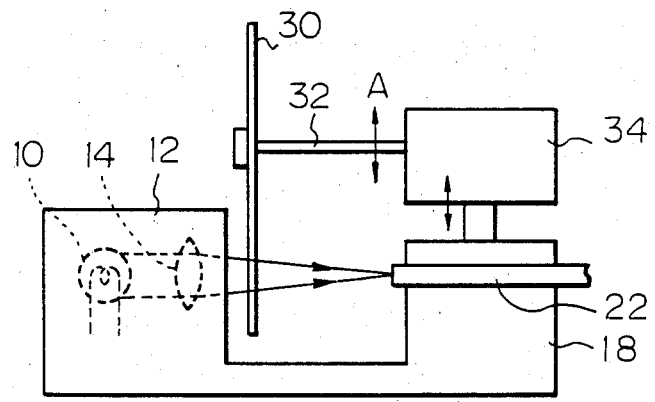
FIG. 2 is a view of an optical filter device embodying the present invention.

Referring to FIG. 2, an optical filter device embodying the present invention is shown and comprises a circular optical filter, or disc, 30. The filter 30 is mounted on drive means such as an output shaft 32 of a motor 34. The rest of the construction is similar in principle to the light source apparatus shown in FIG. 1 and, therefore, employs like reference numerals to designate similar structural elements.

As shown in FIG. 2, the filter or disc 30 is positioned in such a manner as to intersect the optical path between the light source 10 and the light receiving end of the light conducting cable 22. The filter 30 is rotated by the motor 34 through the motor output shaft 32. While the filter 30 is in rotation, a part thereof through which the converged light from the lens 14 having a high energy density is transmitted sequentially changes moment by moment. Stated another way, a given part of the disc 30 is used once for each rotation of the filter 30.

The filter 30 is heated only in its part on which the optical energy is incident and such an area sequentially changes in accordance with the rotation of the disc 30. The heated part of the filter 30 is cooled while the optical energy is not incident thereon so that, as a whole, the filter 30 is prevented from being heated to an objectionably high temperature. The filter 30 may be rotated at a speed high enough to raise wind therearound which would also serve to suppress temperature elevation of the disc 30. Furthermore, the motor output shaft 32 for rotating the disc 30 may be moved perpendicularly to its axis as indicated by a double-headed arrow A in FIG. 2. Such a movement would widen the area of the disc 30 which is available for the purpose described, thereby additionally increasing the service life of the disc 30.

Figure 3:
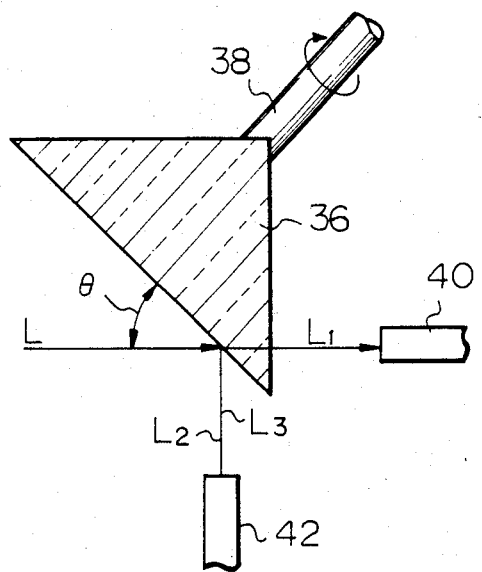
FIG. 3 is a section of another embodiment of the present invention.

Referring to FIG. 3, another embodiment of the present invention is shown which is constructed to filter incident optical energy so as to deliver light components having different wavelengths for different applications. As shown, the optical filter device comprises a filter 36 which has a generally triangular section and is rigidly mounted on a rotatable shaft 38, which may be the motor output as shaft shown in FIG. 2. The filter 36 is positioned to intersect an optical path for light L, while being inclined relative to the optical path by a desired angle $\theta$. A first light conducting cable 40 is located on the optical path downstream of the filter 36, and a second light conducting cable 42 in a position substantially perpendicular to the optical path. In this particular embodiment, the filter 36 is made of a material which is transparent for visible rays and reflective for ultraviolet rays and/or infrared rays.

In operation, because the filter 36 is positioned at a predetermined angle $\theta$ relative to the optical path along which the light L propagates, it may transmit a visible component $L_1$ of the light therethrough toward the light conductor 40 while reflecting infrared rays $L_2$ and ultraviolet rays (and X rays) $L_3$ toward the light conductor 42. The visible rays $L_1$ may be used for the cultivation of chlorella or forcing culture of plants, for example, and the infrared rays $L_2$ and ultraviolet rays $L_3$ for other applications.

The filter 36 may comprise a color glass filter CF or CF-IRF (TOSHIBA GLASS) which reflects infrared rays only. Alternatively, a thin layer of gold may be deposited by evaporation on the surface of the filter 36 in order to reflect ultraviolet rays as well as infrared rays.

Because the filter 36 in FIG. 3 is rotatably disposed in the optical path, it is prevented from being thermally destroyed or deteriorated by the light L which propagates through the optical path. Wind raised by the rotating filter 36 will also cool the disc as previously described.

Figure 4:
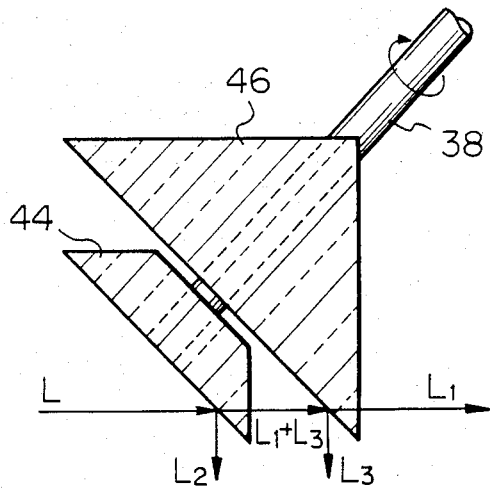
FIG. 4 is a view similar to FIG. 3 but showing still another embodiment of the present invention.

Referring to FIG. 4, still another embodiment of the present invention is shown. The filter device in accordance with this embodiment comprises a first filter member 44 and a second filter member 46 which are commonly mounted on the rotatable shaft 38 as illustrated. The filter member 44 is adapted to reflect infrared rays $L_2$ while transmitting other light components, and the filter member 46 is adapted to reflect ultraviolet rays $L_3$ (and infrared rays) while transmitting other light components. Constructed in the manner described, the filter device of FIG. 4 is capable of separating infrared rays, ultraviolet rays and visible rays from the incident light L independently of each other.

Although the embodiments of the present invention have been shown and described in conjunction with an artificial light source which emits light containing substantial amounts of infrared and ultraviolet rays, e.g. xenon lamp, it will readily occur to those skilled in the art that the present invention is also applicable to an optical path along which solar energy converged to have a high energy density propagates.

In summary, it will be seen that the present invention provides an optical filter device which is capable of filtering optical energy having a high energy density incident thereon whithout being thermally destructed or deteriorated.

Various modifications will become possible for those skilled in the art after receiving the teachings of the present disclosure without departing from the scope thereof.

What is claimed is:

1. An optical filter device for filtering optical energy having a high energy density which propagates along a predetermined optical path, comprising:
    a rotatable optical filter located to constantly intersect the optical path at a part thereof, an axis of rotation of the optical filter being movable perpendicularly to said axis of rotation;
    drive means for rotating said optical filter;
    whereby the optical energy becomes incident on the part of the optical filter which changes every moment due to rotation of the optical filter.

2. An optical filter device as claimed in claim 1, in which the optical filter comprises a disc which is positioned perpendicularly to the optical path to transmit only a component of the optical energy which has a particular wavelength.

3. An optical filter device as claimed in claim 2, in which the component of the optical energy transmitted through the filter is visible ray.

4. An optical filter device as claimed in claim 1, in which the optical filter comprises a filter member which is inclined a predetermined angle relative to the optical path to transmit a component of the optical energy having a particular wavelength and reflect at least one of components in the other wavelength range.

5. An optical filter device as claimed in claim 4, in which said component of the optical energy transmitted through the filter is a visible ray and said at least one of components reflected by the filter is at least one of infrared and ultraviolet rays.

* * * * *